US012799860B2

(12) United States Patent
Chainani et al.

(10) Patent No.: US 12,799,860 B2
(45) Date of Patent: Nov. 17, 2026

(54) HYDRAULIC LEAK DETECTION NOVEL ALGORITHM AND METHOD FOR OFFSHORE OIL AND GAS PLATFORMS

(71) Applicant: SAUDI ARABIAN OIL COMPANY, Dhahran (SA)

(72) Inventors: Jai Ashok Chainani, Dhahran (SA); Hussain M. Bayat, Saihat (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 401 days.

(21) Appl. No.: 18/489,429

(22) Filed: Oct. 18, 2023

(65) Prior Publication Data

US 2025/0129712 A1 Apr. 24, 2025

(51) Int. Cl.
*E21B 47/117* (2012.01)
*F15B 19/00* (2006.01)

(52) U.S. Cl.
CPC .......... *E21B 47/117* (2020.05); *F15B 19/005* (2013.01)

(58) Field of Classification Search
None
See application file for complete search history.

(56) References Cited

U.S. PATENT DOCUMENTS 5,715,799 A 2/1998 Blomquist et al.
5,748,077 A 5/1998 Brandt
9,909,948 B1 * 3/2018 Stewart ................. E21B 47/117
2012/0228027 A1 * 9/2012 Sehsah .................... E21B 21/08 175/48
2014/0123747 A1 * 5/2014 Veeningen ............ E21B 47/001 73/152.51
2016/0115776 A1 * 4/2016 Haci ..................... E21B 43/261 175/48
2016/0245027 A1 * 8/2016 Gumus ................... E21B 44/00

OTHER PUBLICATIONS

T. Stavenes, "Subsea Hydraulic Leakage Detection and Diagnosis", NTNU Norwegian University of Science and Technology, Jun. 14, 2010 (107 pages).
K. Slater, "Detecting and Managing Hydraulic System Leakage", Machinery Lubrication, Jan. 1, 2010 (14 pages).

* cited by examiner

*Primary Examiner* — Huy Q Phan
*Assistant Examiner* — Carl F.R. Tchatchouang
(74) *Attorney, Agent, or Firm* — Osha Bergman Watanabe & Burton LLP

(57) ABSTRACT

A method to detect hydraulic leaks in unmanned locations includes obtaining a first pressure reading, starting a header pressure pump if the first pressure reading meets a low-level threshold; determining if production valves were opened; terminating operation of the header pressure pump if second pressure reading meets a high-level threshold; and incrementing a pump counter by one. The method includes storing a first snapshot of a fluid level when the pump counter is greater than a pump cycle threshold and starting a predetermined time interval following storing of the first snapshot; storing a second snapshot of the fluid level after the predetermined time interval expires and calculating a difference between the second snapshot and the first snapshot; initiating an alarm when the difference is greater than an allowable leak threshold and resetting the pump counter at a specific time of day.

14 Claims, 5 Drawing Sheets

HYDRAULIC LEAK DETECTION NOVEL ALGORITHM AND METHOD FOR OFFSHORE OIL AND GAS PLATFORMS

BACKGROUND

Hydraulic systems use pressurized fluids to power machinery such as backhoes, bulldozers, aircraft, elevators, brake systems, etc. Hydraulic systems may also be used to power wellhead production valves such as surface controlled subsurface safety valves (SCSSV), wing valve (WV) and Emergency Shutdown valves (ESDV), etc. Hydraulic fluids may be a water-based, synthetic, or oil-based material among others. Hydraulic systems use equipment such as cylinders, pumps, hoses, tubing, fittings, etc. to house and move the hydraulic fluid. The equipment endures high pressures as components such as hydraulic cylinders and pumps pressurize the fluid to move actuators of machinery as wells as wellhead production safety equipment.

Due to the high pressures experienced with normal operation as well as wear from movement of machinery and wellhead safety equipment, fluid leaks may develop. Fluid leaks may develop at joints of the equipment as well as walls of the equipment inducing failure or damage from work operations. Once fluid leaks are detected, the faulty equipment needs to be fixed or replaced in order to halt the fluid leak. If a location with one or more fluid leaks is unmanned or unsupervised, the fluid leak may go unnoticed for an extended period. Fluid leaks may inhibit machinery and valve performance or equipment such as wellhead production valves may experience catastrophic failure and shutdown if left unattended. Fluid leaks may also cause environmental contamination, for example in offshore environments, that is undesirable.

SUMMARY

In some aspects, embodiments described herein relate to a method for hydraulic leak detection in unmanned locations. The method includes obtaining a first pressure reading and determining if the first pressure reading is less than a low-level threshold. The method includes starting a header pressure pump when the first pressure reading is less than the low-level threshold. The method includes determining if one or more production valves are open and then obtaining a second pressure reading. The method includes determining if the second pressure reading is greater than a high-level threshold and then terminating operation of the header pressure pump when the second pressure reading is greater than the high-level threshold. The method includes incrementing a pump counter by one after terminating operation of the header pressure pump and then determining if the pump counter is greater than a pump cycle threshold. The method includes storing a first snapshot of a fluid level when the pump counter is greater than the pump cycle threshold and then starting a predetermined time interval following storing of the first snapshot. The method includes storing a second snapshot of the fluid level following expiration of the predetermined time interval and calculating a difference of the second snapshot from the first snapshot. The method includes determining if the difference is greater than an allowable leak threshold and initiating an alarm when the difference is greater than the allowable leak threshold. The method also includes resetting the pump counter at a specific time of day.

In some aspects, embodiments described herein relate to a hydraulic leak detection system in unmanned locations. The system includes a closed hydraulic system including a hydraulic fluid, a fluid reservoir configured to hold the hydraulic fluid, a header pressure pump, and one or more connectors. The system also includes one or more production valves and a monitoring system operatively connected to the header pressure pump. The monitoring system also includes a pump counter, operatively connected to a programmable pressure controller; a fluid sensor operatively disposed on the fluid reservoir, wherein the fluid sensor is configured to monitor a fluid level within the fluid reservoir; an alarm; a detection control subsystem including the programmable pressure controller operatively connected to the header pressure pump; wherein one or more connectors are operatively connected within the closed hydraulic system and configured to transfer the hydraulic fluid; wherein the header pressure pump is operatively connected to the closed hydraulic system and is configured to maintain a header pressure within the closed hydraulic system; wherein the programmable pressure controller is configured to control operation of the header pressure pump; wherein the pump counter is configured to increase by one when the header pressure pump stops operation; wherein the fluid reservoir is operatively connected to the header pressure pump; wherein the detection control subsystem is configured to send control commands to components of the hydraulic leak detection system; and wherein the header pressure pump, the programmable pressure controller, the pump counter, and the alarm are configured to receive commands from the detection control subsystem.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
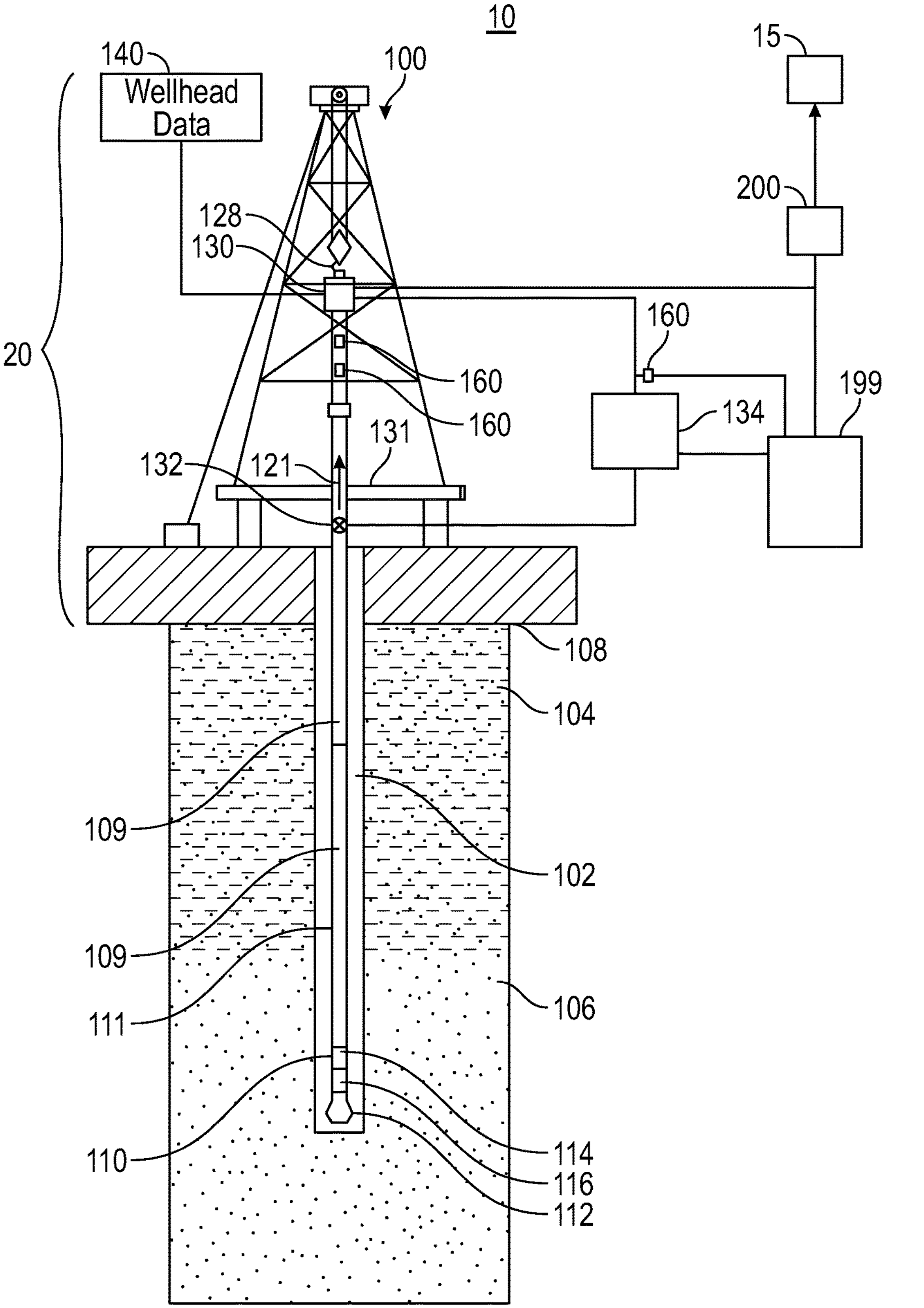
FIG. 1 illustrates a hydraulic leak detection system at an unmanned location in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-5, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Disclosed herein is a method and a system for hydraulic leak detection in unmanned locations that includes remote operation, monitoring, control, and notification of a status of the hydraulic leak detection system. The hydraulic leak detection system includes monitoring a hydraulic system having a fluid. The hydraulic system may be any system that uses a fluid to move an actuator, for example, a hydraulic system that lowers a landing gear of an aircraft or opens a valve of a production oil and gas well. In one or more embodiments, the hydraulic system may be a closed hydraulic system having a hydraulic fluid. In other embodiments, the hydraulic system may be an open hydraulic system. The hydraulic system is configured to maintain a pressure within the hydraulic system within a predetermined pressure band. The hydraulic fluid may be any fluid suitable for use in hydraulic systems such as oil, water, and air-based material. The method and system as disclosed herein seeks to detect and notify a user of potential hydraulic leaks of the hydraulic fluid from the hydraulic system. A hydraulic leak can be any unexpected loss of the hydraulic fluid within the hydraulic system without regard to the quantity of the unexpected loss. The hydraulic leak may occur at one or more positions along the hydraulic system.

FIG. 1 depicts the present invention incorporated on an oil and gas platform (20) in accordance with one or more embodiments. The oil and gas platform (20) may be unmanned and is used for extracting oil and/or gas from a subregion below a ground surface such as an ocean bottom. FIG. 1 is an example embodiment of an unmanned location (10) and is not meant to limit the scope disclosed herein. Those skilled in the art will appreciate that while embodiments disclosed herein are discussed with respect to unmanned locations, in one or more embodiments, the instant disclosure may also be used in manned locations (15) such as a user interface. Unmanned locations are locations with little to no supervisory persons that are on a permanent or rotational work schedule. The production unit is positioned above an ocean surface. In one or more embodiments, the production unit may be positioned on a plurality of platform legs. The plurality of platform legs may extend down to the ocean bottom. In one or more embodiments, the production unit may be suspended above the water surface by a spar and a plurality of tension cables. The method and the system for hydraulic leak detection as disclosed herein have wide application and use. In one or more embodiments, the present invention may also be used for, but not limited to, hydraulic lifts, hydraulic brakes, construction machinery such as bulldozers, and within aircraft for adjusting the aircraft's wings and extension of landing gear.

FIG. 1 shows an example oil and gas platform (20) in accordance with one or more embodiments. In general, well sites may be configured in a myriad of ways. Therefore, the oil and gas platform (20) is not intended to be limiting with respect to the particular configuration of the production equipment. The oil and gas platform (20) is depicted as being on land having a platform floor (131). In other examples, the oil and gas platform (20) may be offshore. The oil and gas platform (20) is illustrated that includes a hydrocarbon reservoir (hereafter "reservoir") (106) located in a subsurface formation (hereafter "formation") (104) and a well system (100). The hydrocarbon-bearing formation (104) may include a porous or fractured rock formation that resides underground, beneath the earth's surface (hereafter "surface") (108). In the case of the well system (100) being a hydrocarbon well, the reservoir (106) may include a portion of the hydrocarbon-bearing formation (104). The hydrocarbon-bearing formation (104) and the reservoir (106) may include different layers of rock having varying characteristics, such as varying degrees of permeability, porosity, capillary pressure, and resistivity. In the case of the well system (100) being operated as a production well, the well system (100) may facilitate the extraction of hydrocarbons (or "production") from the reservoir (106).

In some embodiments, the well system (100) includes a wellbore (102), a well surface system (134). The well surface system (134) may control various operations of the well system (100), such as well production operations, well completion operations, well maintenance operations, and reservoir monitoring, assessment and development operations. In some embodiments, the well surface system (134) includes a computer system (199) that is the same as or similar to that of computer (502) described below in FIG. 5 and the accompanying description.

The wellbore (102) may include a bored hole that extends from the surface (108) into a target zone of the hydrocarbon-bearing formation (104), such as the reservoir (106). An upper end of the wellbore (102), terminating at or near the surface (108), may be referred to as the "up-hole" end of the wellbore (102), and a lower end of the wellbore (102), terminating in the hydrocarbon-bearing formation (104), may be referred to as the "down-hole" end of the wellbore (102). The wellbore (102) may facilitate the circulation of drilling fluids during drilling operations, the flow of hydrocarbon production (hereafter "production") (121) (e.g., oil and gas) from the reservoir (106) to the surface (108) during production operations, the injection of substances (e.g., water) into the hydrocarbon-bearing formation (104) or the reservoir (106) during injection operations, or the communication of monitoring devices (e.g., logging tools) into the hydrocarbon-bearing formation (104) or the reservoir (106) during monitoring operations (e.g., during in situ logging operations).

In some embodiments, during operation of the well system (100), the well surface system (134) collects and records wellhead data (140) for the well system (100). The wellhead data (140) may include, for example, a record of measurements of wellhead pressure (e.g., including flowing wellhead pressure), wellhead temperature (e.g., including flowing wellhead temperature), wellhead production rate over some or all of the life of the well system (100), and water cut data. In some embodiments, the measurements are recorded in real-time, and are available for review or use within seconds, minutes or hours of the condition being sensed (e.g., the measurements are available within 1 hour of the condition being sensed). In such an embodiment, the wellhead data (140) may be referred to as "real-time" wellhead data (140). Real-time wellhead data (140) may enable an operator of the well system (100) to assess a relatively current state of the well system (100) and make real-time decisions regarding development of the well system (100) and the reservoir (106), such as on-demand adjustments in regulation of production flow from the well.

In some embodiments, the well system (100) includes casing installed in the wellbore (102). For example, the wellbore (102) may have a cased portion and an uncased (or "open-hole") portion. The cased portion may include a portion of the wellbore having casing (e.g., casing pipe and casing cement) disposed therein. The uncased portion may include a portion of the wellbore not having casing disposed therein. In some embodiments, the casing includes an annular casing that lines the wall of the wellbore (102) to define a central passage that provides a conduit for the transport of tools and substances through the wellbore (102). For example, the central passage may provide a conduit for lowering logging tools into the wellbore (102), a conduit for the flow of production (121) (e.g., oil and gas) from the reservoir (106) to the surface (108), or a conduit for the flow of injection substances (e.g., water) from the surface (108) into the hydrocarbon-bearing formation (104). In some embodiments, the well system (100) includes production tubing installed in the wellbore (102). The production tubing (110) may provide a conduit for the transport of tools and substances through the wellbore (102). The production tubing (110) may, for example, be disposed inside casing. In such an embodiment, the production tubing may provide a conduit for some or all of the production (121) (e.g., oil and gas) passing through the wellbore (102) and the casing.

In some embodiments, the well surface system (134) includes a wellhead (130). The wellhead (130) may include a rigid structure installed at the "up-hole" end of the wellbore (102). The wellhead (130) may include structures for supporting (or "hanging") a casing string (111) with one or more casing sections (109) and production tubing (110) extending into the wellbore (102). Production (121) may flow from the reservoir (106) through a completions system (116) that may include a downhole safety valve (DSV). The production may flow through the wellbore (102) and through the wellhead (130), after exiting the wellbore (102), including, for example, the casing string (111) and the production tubing (110). In some embodiments, the well surface system (134) includes flow regulating devices that are operable to control the flow of substances into and out of the wellbore (102). For example, one or more production valves (132) may be fully opened to enable unrestricted flow of production (121) from the wellbore (102), the one or more production valve (132) may be partially opened to partially restrict (or "throttle") the flow of production (121) from the wellbore (102), and the one or more production valves (132) may be fully closed to fully restrict (or "block") the flow of production (121) from the wellbore (102), and through the well surface system (134).

In some embodiments, the wellhead (130) includes a choke assembly. For example, the choke assembly may include hardware with functionality for opening and closing the fluid flow through pipes in the well system (100). Likewise, the choke assembly may include a pipe manifold that may lower the pressure of fluid traversing the wellhead. As such, the choke assembly may include set of high pressure valves and at least two chokes. These chokes may be fixed or adjustable or a mix of both. Redundancy may be provided so that if one choke has to be taken out of service, the flow can be directed through another choke. In some embodiments, pressure valves and chokes are communicatively coupled to the well control system (126). Accordingly, a well control system (126) may obtain wellhead data regarding the choke assembly as well as transmit one or more commands to components within the choke assembly in order to adjust one or more choke assembly parameters.

Continuing with FIG. 1, the oil and gas platform (20) operates and maintains the hydraulic system to operate gas wellhead production valves and emergency shutdown zone valves ("ESDVs") to ensure safe and reliable operations, in accordance with one or more embodiments. The oil and gas platform (20) may include a supervisory control and data acquisition ("SCADA") system (160). The SCADA system (160) is used to remotely operate the hydraulic valves. In some embodiments, the well system (100) communicates with the SCADA system (160) using wired and/or wireless data communication networks. The SCADA system (160) is a supervisory control system of computers, networked data communications and graphical user interfaces for gathering and analyzing real time data, such as the wellhead data (140) and other data collected by the well system (100). Specifically, the SCADA system (160) is used to monitor and control the well system (100). For example, various hydraulic valves, such as the one or more production valves (132) and/or other surface/subsurface valves of the well system (100), are remotely controlled using the SCADA system (160). In particular, each hydraulic valve can be closed and/or opened in response to a control signal sent from, or otherwise activated by the SCADA system (160). In one or more embodiments of the invention, the SCADA system (160) is implemented based on the computer system (199) that is the same as or similar to that of computer (502) described below in FIG. 5 and the accompanying description.

Figure 2:
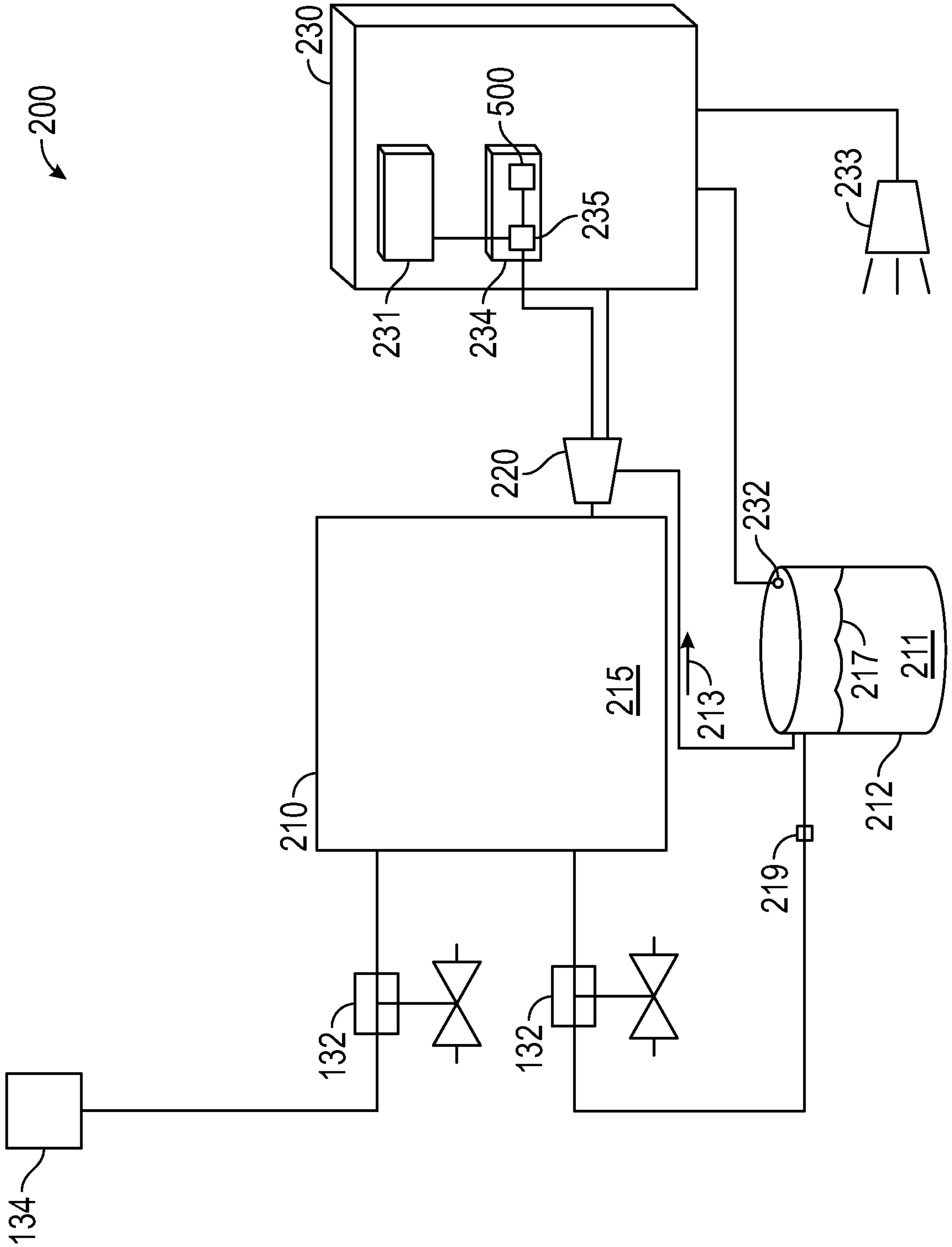
FIG. 2 depicts a hydraulic leak detection system in accordance with one or more embodiments.

FIG. 2 shows a hydraulic leak detection system (hereafter "detection system") (200) in accordance with one or more embodiments. In one or more embodiments, one or more of the modules and/or elements shown in FIG. 2 may be omitted, repeated, combined, and/or substituted. Accordingly, embodiments disclosed herein should not be considered limited to the specific arrangements of modules and/or elements shown in FIG. 2.

In accordance with one or more embodiments, the detection system (200) may include a closed hydraulic system (hereafter "closed system") (210). The closed system (210) may include one or more connectors (219) such as clamps, fittings, process relief valves ("PRVs"), solenoids, actuator seals, pipes, hoses, but are not limited to this. Various systems within the well system (100) may be operatively connected with the closed system (210) such as the well surface system (134), and the wellhead (130). One or more connectors (219) are operatively connected within the closed system and/or with the well system (100) being configured to transfer the hydraulic fluid. There are various points within the closed system (210) where one or more hydraulic leaks may occur. For example, points susceptible to one or more hydraulic leaks are where clamps, fittings, PRVs, solenoids, and actuator seals are operatively connected together and/or with the well system (100). The closed system (210) may also leak where pipes and hoses have developed holes in walls of the pipes and hoses. The detection system (200) may also be integrated with the SCADA system (160).

The detection system (200) may utilize state of art technologies for pressure sensing and pressure control. For example, the detection system (200) may include the one or more production valves (132) that are operable to control the flow of production (121) and are operably connected to the well surface system (134) and/or the closed system (210). The one or more production valves may include a surface controlled subsurface safety valve (SCSSV), a wing valve (WV) and an emergency shutdown valve (ESDV), etc. The detection system (200) may include a monitoring system (230). The monitoring system (230) includes a detection control subsystem (hereafter "control subsystem") (234). The monitoring system (230) may use digital pressure measurement devices that may continuously measure the pressure within the detection system (200). The pressure measurement may be electronically transmitted to a programmable pressure controller (hereafter "controller") (235) included in the control subsystem (234). The controller (235) may be an electrically-actuated switch. The controller (235) may be digitally set to send a signal when the pressure in the hydraulic system meets a target pressure tolerance. The controller (235) may include programmable pressure controls. The programmable pressure controls may include programmable instructions for valves, pumps, and the like.

The monitoring system (230) is configured to monitor a header pressure (215) (e.g., HPU pump discharge header pressure). The header pressure (215) is a particular pressure exerted at a common header in a hydraulic system which is used by operating elements such as the one or more production valves. The one or more production valves are operably connected to the closed system (210). The hydraulic pump maintains the header pressure at a constant pressure to prevent abnormal conditions in the hydraulic system.

In accordance with one or more embodiments, the detection system (200) may work automatically and may continuously monitor and control the header pressure (215) required to maintain the header pressure (215) within the hydraulic system. The detection system (200) may be used to maintain the header pressure (215) at a predetermined bandwidth, for example, between 4,000 PSI (pounds per square inch) to 7,000 PSI. The detection system (200) may include a pressurizing device such as a header pressure pump (a hydraulic pump, pneumatically powered pump, air-driven liquid pump, and the like, hereafter "pressure pump") (220), and the control subsystem (234). The pressurizing device and the control subsystem (234) are all disposed in operative proximity to the hydraulic system at the unmanned location. The controller (235) is configured to control the operation of the pressurizing device, for example, the pressure pump. The pressurizing device is configured to maintain the header pressure (215) between the predetermined bandwidth of the hydraulic system. The pressure pump (220) may supply the hydraulic fluid (211) to the hydraulic system. The monitoring system (230) may be operatively connected to the pressure pump (220) and/or the closed system (210) in order to monitor the header pressure (215). The control subsystem (234) is configured to send control commands to components of the detection system (200) such as the pressure pump (220) and the controller (235). The pressure pump (220) and the controller (235) are configured to receive commands from the control subsystem.

The detection system (200) may include the control subsystem (234) and related instrumentation to achieve the automation capability. The detection system (200) may include pressure sensing devices, such as a pressure transmitter and/or a digital pressure gauge, etc. The detection system (200) may include a pressure safety relief capability, such as using a relief valve, a flush valve, a rupture disk, a bypass valve, etc., disposed to protect the detection system (200) from overpressure by avoiding, preventing, and/or mitigating against overpressure conditions.

Continuing with FIG. 2, in one or more embodiments, the detection system (200) may include a closed hydraulic system (hereafter "closed system") (210). The detection system (200) is in hydraulic communication with the closed system (210). The detection system (200) further comprises hydraulic lines such as pipes, tubes, hoses, etc. connecting components. The pressure pump (220) is operatively connected to the closed hydraulic system. The detection system (200) has a hydraulic flow path (213). The pressure pump (220) may be powered by a pump operating medium such as electrical power, fluid power, mechanical power, and the like. The pressure pump (220) is arranged in a hydraulically closed loop in the hydraulic flow path (213) with a hydraulic actuator (hydraulic cylinder, hydraulic motor, and the like). The hydraulic actuator converts hydraulic power into mechanical power that may perform work such as opening and closing of the one or more production valves (132).

The closed system (210) may include a fluid reservoir (212). The fluid reservoir (212) is operatively connected to the pressure pump (220). The pressure pump (220) is configured to maintain the header pressure (215) within the closed hydraulic system. The pressure pump (220) may pressurize the hydraulic fluid (211) to within the predetermined pressure bandwidth. The pressure pump (220) may be started and/or stopped from the control subsystem (234) according to one or more signals received from the controller (235).

In accordance with one or more embodiments, the pressure pump (220) comprises a pump inlet and a pump outlet, both of which form part of the hydraulic flow path (213). The pressure pump (220) may cause the hydraulic fluid (211) to flow in a pumped direction from the pump inlet to the pump outlet, at the hydraulic fluid flowrate, and in turn to the hydraulic actuator. The pressure pump (220) pressurizes the hydraulic fluid (211) and forms the pressurized the hydraulic fluid (211) at the predetermined pressure bandwidth. While the detection system (200) may correspond to the single pressure pump (220), in some embodiments, the detection system (200) may correspond to multiple pumps.

In accordance with one or more embodiments, the monitoring system (230) may include one or more sensors (e.g. pressure transmitter, temperature sensor, etc.) configured to measure, for example, pressure, temperature, pressure parameters of equipment and/or other parameters. The monitoring system (230) may include a fluid sensor (232) such as a differential pressure, a guided wave radar sensor, and the like. The fluid sensor (232) is configured to monitor a fluid level (217) within the fluid reservoir (212). The fluid sensor (232) is operatively disposed on the fluid reservoir (212). The fluid sensor (232) is operatively connected to the monitoring system (230). The monitoring system (230) may include precision pressure gauges. These gauges may provide a data logging feature to monitor and analyze pressure increments in the detection system (200). The monitoring system (230) may include a display showing all system parameters, such as pressure parameters. The monitoring system (230) may include a pump counter (231). The pump counter (231) is configured to count each pump cycle when operation of the pressure pump (220) starts and/or stops and tally a pump cycle count. The pump counter (231) may be a digital counter, a mechanical counter, and the like. The pump counter (231) is operatively connected to the controller (235). The pump cycle count may be initialized to zero. The monitoring system (230) may include a protection system. The protection system may provide system overrides to protect from a system failure such as due to overpressure.

Further, in one or more embodiments, the monitoring system (230) may include an alarm (233). The alarm (233) is configured to provide notifications to operators. The alarm (233) may be a digital alarm that sends notification to a device such as a mobile device. The alarm (233) may be a sound device that emits sound notifications. The notifications may be audible and/or visual alarms. The notifications may be operational actions such as starting the pressure pump (220) if the closed system (210) is below an operational threshold, for example, the operational threshold is 4000 PSI. The alarm (233) is operatively connected to the monitoring system (230). The alarm (233) is configured to receive commands from the control subsystem (234).

In accordance with one or more embodiments, the control subsystem (234) may include a power supply and the controller (235). The power supply may receive an input voltage of, for example, 110 or 220 VAC (volts alternating current) at 60 Hz (Hertz) of utility power. The power supply is configured to deliver electrical power to the components of the detection system (200). The controller (235) is operatively connected to the pressure pump (220).

In accordance with one or more embodiments, the control subsystem (234) may also include the computer system (199) that is the same as or similar to that of computer (502) described below in FIG. 5 and the accompanying description. The computer system (199) may include a computer interface and a computer display. The computer system (199) is configured to monitor one or more sensors, for example, the fluid sensor (232). The computer system (199) is also configured to send/receive one or more signals to/from components, for example, the pump counter (231). The computer system (199) is also configured to initiate and/or terminate the alarm (233). The computer system (199) is operatively connected to the controller (235). The computer system (199) may be electrically connected to the power supply, or the computer system (199) may include an internal battery.

One or more computer-readable media associated with the controller (235) may also include computer-executable instructions (a program) configured to collect, store, parse, and analyze the operational data of the system. The program may be configured to perform operations consistent with embodiments of the present disclosure, for example, determine current state variables of the detection system (200), adjust various operating characteristics based on determined values, etc. The program may further arithmetically calculate revised state variables that seek output state goals, such as for example, mathematically seeking target values associated with variables of the system in response to feedback from a workflow in cooperation with systems and methods of the present disclosure.

In accordance with one or more embodiments, the control subsystem (234) may include a control panel. The control panel is electrically connected to the power supply. The control panel may have a power switch. The control panel may have a panel interface and a panel display. The control panel is configured to monitor one or more sensors, for example, the fluid sensor (232). The control panel is configured to send/receive one or more signals to/from components, for example, the pump counter (231). The control panel is also configured to initiate and/or terminate the alarm (233). The control panel is operatively connected to the controller (235).

Figure 3:
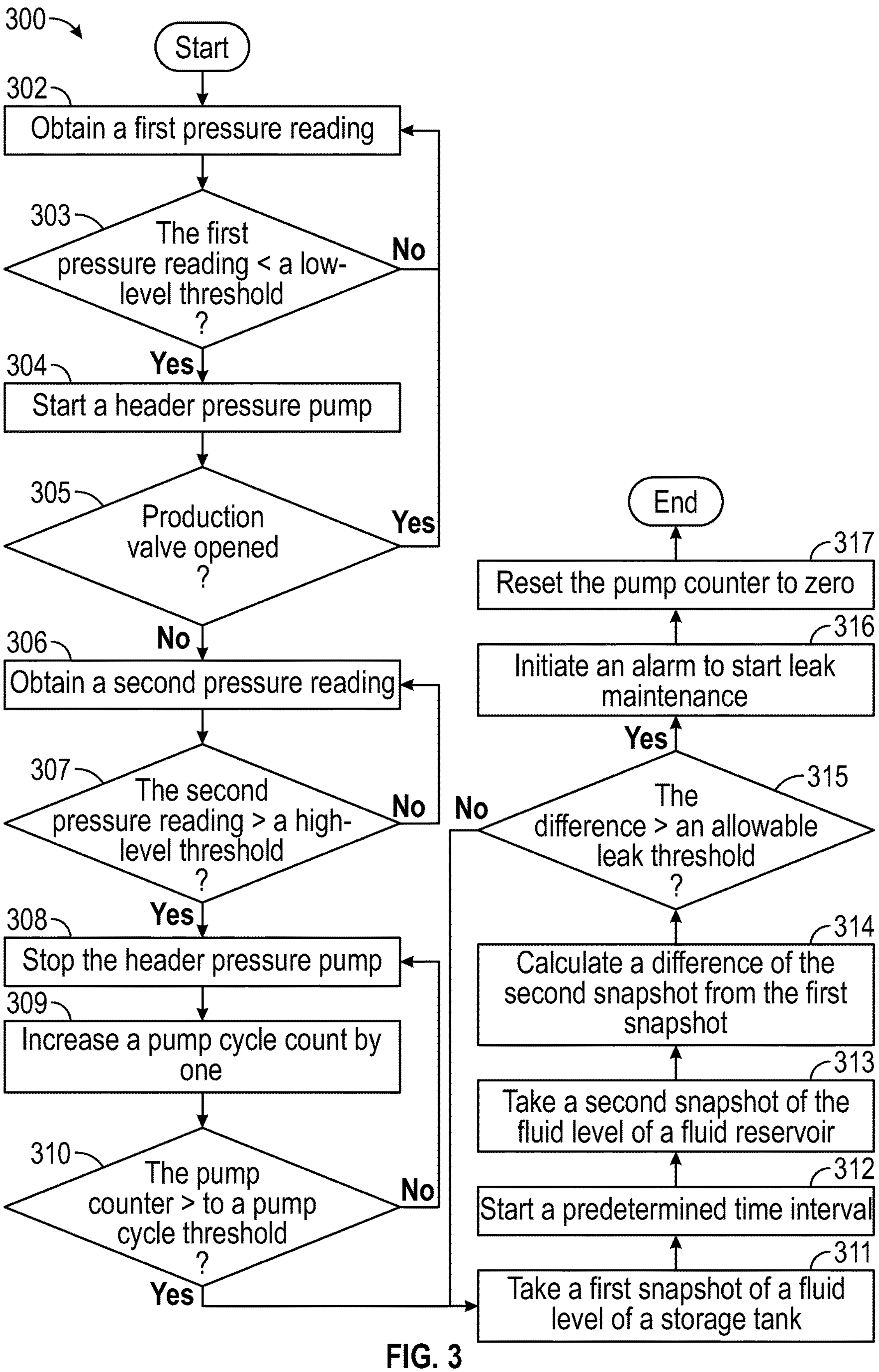
FIG. 3 depicts a hydraulic leak detection method in accordance with one or more embodiments.

FIG. 3 illustrates a method for detection of hydraulic leaks (hereafter "detection method") (300). The detection method (300) allows for automatically and continuous controlling and monitoring of the detection system (200). Further, one or more steps in FIG. 3 may be performed by one or more components as described in FIGS. 1 and 2 (e.g., the detection system (200)). While the various steps in FIG. 3 are presented and described sequentially, one of ordinary skill in the art will appreciate that some or all of the steps may be executed in different orders, may be combined or omitted, and some or all of the steps may be executed in parallel. Furthermore, the steps may be performed actively or passively. Operators may launch an automated software for operating the detection system (200). The operator may acknowledge various steps of the method by clicking on, in the input interface, text descriptions of the steps.

In one or more embodiments, the detection method may be initiated if a hydraulic leak is expected or to monitor the closed system (210) continuously. The operator may determine one or more thresholds, for example, a low-level threshold, a high-level threshold, a pump cycle threshold, and an allowable leak threshold. The one or more thresholds may be programmable in the control subsystem (234). In step 302, the detection system (200) obtains a first pressure reading. The first pressure reading may be obtained by the control subsystem (234) received from one or more sensors, for example, the digital pressure measurement devices. The first pressure reading may be displayed on the display of the monitoring system (230). In step 303, the control subsystem (234) may determine if the first pressure reading is less than the low-level threshold, for example, if the low-level threshold is 4,000 PSI. The control subsystem (234) may use a programmable algorithm to make a comparison of the first pressure reading and the low-level threshold. As depicted in step 303, if the first pressure reading is equal to or greater than the low-level threshold, the detection system (200) may continue to obtain one or more pressure readings until the pressure reading is less than the low-level threshold. If the first pressure reading is less than the low-level threshold, the detection system (200) may initiate operation of the pressure pump (220) as depicted in step 304. The pressure pump (220) will pressurize the closed system (210). In Step 305, the detection system (200) determines if any of the one or more production valves (132) was opened that resulted in drop in the header pressure (215) and subsequent start of the pressure pump (202). If the production valve was opened, then the detection system (200) may continue to obtain one or more pressure readings until the pressure reading is less than the low-level threshold. If the one or more production valves was not opened resulting in the pressure drop, then the detection system (200) may initiate the header pressure pump (220) and continue with the detection method (300).

In step 306, the detection system (200) may obtain a second pressure reading. The second pressure reading may be obtained by the control subsystem (234) received from one or more sensors, for example, the digital pressure measurement devices. The second pressure reading may be displayed on the display of the monitoring system (230). In step 307, the control subsystem (234) may determine if the second pressure reading is greater than the high-level threshold, for example, if the high-level threshold is 7000 PSI. The control subsystem (234) may use the programmable algorithm to make a comparison of the second pressure reading and the high-level threshold. If the first pressure reading is equal to or less than the high-level threshold, the detection system (200) may continue to obtain one or more pressure readings until the pressure reading is greater than the high-level threshold. If the second pressure reading is greater than the high-level threshold, the detection system (200) may terminate operation of the pressure pump (220) as depicted in step 308. After the pressure pump (220) has ceased operating, the count of the pump counter (231) is increased by one as depicted in step 309.

In one or more embodiments, the control subsystem (234) receives the pump cycle count (hereafter "count") from the pump counter (231). The count can be displayed on the display of the monitoring system (230). In step 310, the control subsystem (234) may determine if the count is greater than the pump cycle threshold, for example, if the pump cycle threshold is 2 pump cycles. The control subsystem (234) may use a programmable algorithm to make a comparison of the count and the pump cycle threshold. If the count is equal to or less than the pump cycle threshold, the control subsystem (234) may continue to count pump cycles until the count is greater than the pump cycle threshold. If the count of the pump counter (231) is greater than the pump cycle threshold, the control subsystem (234) may store a first snapshot of the fluid level (217) from the fluid sensor (232) as depicted in step 311. The first snapshot may be stored on the computer readable medium. In step 312, following reception of the first snapshot, the control subsystem (234) may start a predetermined time interval. In some embodiments, the predetermined time interval may be seconds, minutes or hours of the first snapshot, for example the predetermined time interval may be 1 hour. Following expiration of the predetermined time interval, the control subsystem (234) may receive a second snapshot of the fluid level (217) from the fluid sensor (232) as depicted in step 313. In step 314, the control subsystem (234) may calculate a difference between the second snapshot and the first snapshot. The difference may be displayed on the display of the monitoring system (230). In step 315, the control subsystem (234) may determine if the difference is greater than the allowable leak threshold, for example, the allowable leak threshold is 1 quart of the hydraulic fluid. The control subsystem (234) may use a programmable algorithm to calculate the difference and/or a comparison of the difference and the allowable leak threshold. If the difference is equal to or less than the allowable leak threshold, the control subsystem (234) may continue to receive one or more snapshots until the difference between sequential snapshots is greater than the allowable leak threshold. If the difference is greater than the allowable leak threshold, the control subsystem (234) may initiate the alarm (233) as in step 316. The alarm (233) may notify personnel to start any leak maintenance. In step 317, the count from the pump counter (231) may be reset to zero at a specific time of day, for example, the count is reset at midnight.

In one or more alternative embodiments, the detection method may initiate with step 302 and step 311 simultaneously, proceeding with each sequential step and initiating the alarm in step 316 when both step 310 and step 315 returning in the affirmative.

Figure 4:
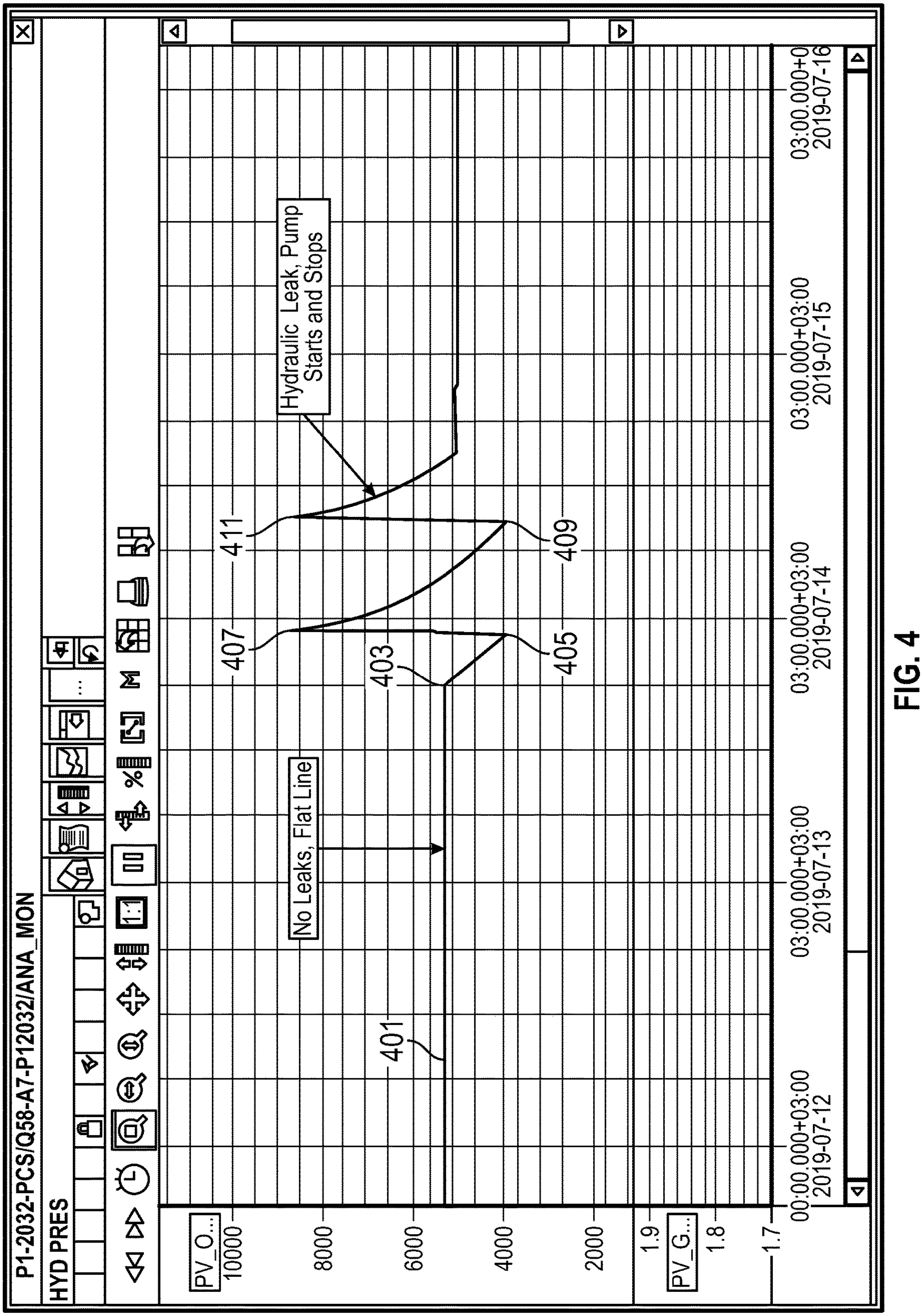
FIG. 4 depicts an example embodiment of a hydraulic leak detection system.

FIG. 4 shows an example embodiment of embodiments disclosed herein. The example embodiment of FIG. 4 depicts one or more pressure readings (401) from the one or more sensors of the monitoring system (230). The generally constant pressure readings of the one or more pressure readings (401) depict the closed system (210) without any leaks. At a first deflection (403), the closed system (210) may be losing pressure unexpectedly. As the pressure further decreases, the one or more pressure readings (401) is compared to the low-level threshold. At a first trough (405), when the one or more pressure readings (401) is less than the low-level threshold, operation of the pressure pump (220) is initiated. The pressure pump (220) may repressurize the closed system (210) by pumping the hydraulic fluid (211) from the fluid reservoir (212) into the closed system (210). At a first peak (407), when the one or more readings are greater than the high-level threshold, operation of the pressure pump (220) is terminated. The count is increased by one and compared to the pump cycle threshold. If the count is less than the pump cycle threshold, the cycle is repeated. After the pressure pump is terminated, the one or more pressure readings (401) depict the closed system (210) losing pressure. At a second trough (409), when the one or more pressure readings (401) is less than the low-level threshold, operation of the pressure pump (220) is initiated. The pressure pump (220) may repressurize the closed system (210) by pumping the hydraulic fluid (211) from the fluid reservoir (212) into the closed system (210). At a second peak (411), when the one or more pressure readings (401) is greater than the high-level threshold, operation of the pressure pump (220) is terminated. The count is increased by one and compared to the pump cycle threshold. If the pump cycle threshold has been met, an alarm (233) may notify personnel to start leak maintenance. Once the leak maintenance has been completed, the generally constant pressure readings of the one or more pressure readings (401) depict the closed system (210) without any leaks again.

Figure 5:
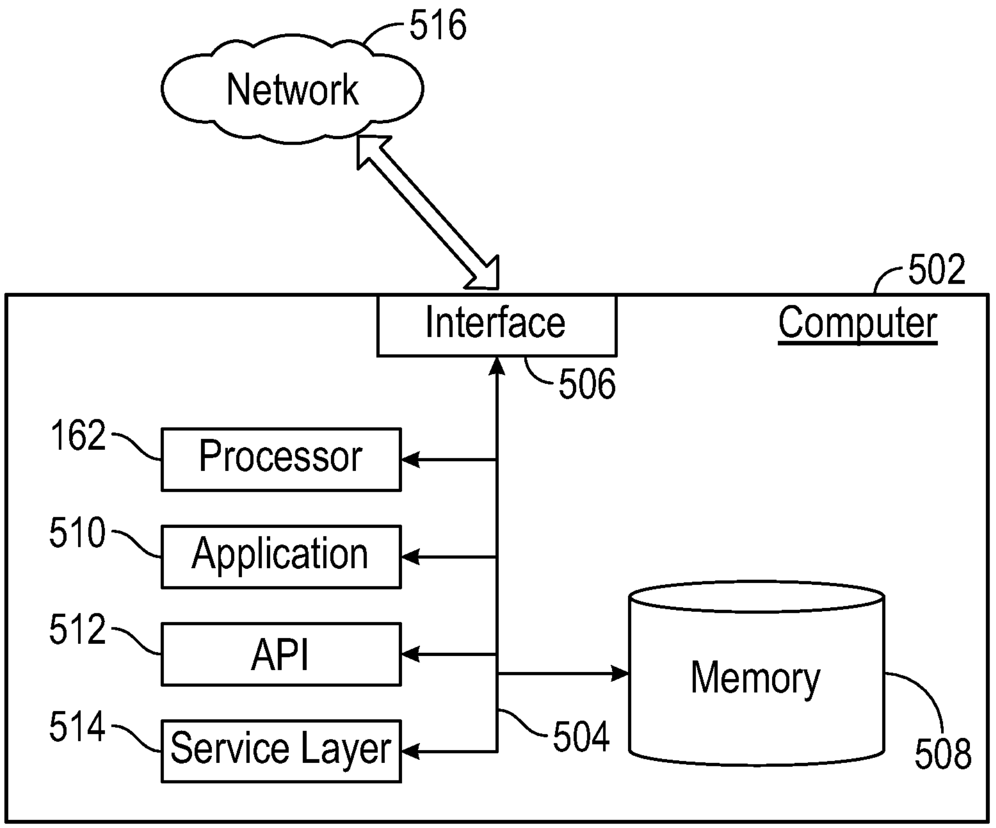
FIG. 5 depicts a computer in accordance with one or more embodiments.

FIG. 5 is a block diagram of a computer (502) used to provide computational functionalities associated with described algorithms, methods, functions, processes, flows, and procedures as described in the instant disclosure, according to an implementation. The computer (502) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (502) may include a computer that includes an input device, such as a keypad, keyboard, touch screen, or other device that can accept user information, and an output device that conveys information associated with the operation of the computer (502), including digital data, visual, or audio information (or a combination of information), or a graphical user interface ("GUI".)

The computer (502) can serve in a role as a client, a network component, a server, a database or other persistency, or any other component (or a combination of roles) of a computer for performing the subject matter described in the instant disclosure. The computer (502) is communicably coupled with a network (516). In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (516) from a client application (for example, executing on another computer (502) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (504). In some implementations, any or all of the components of the computer (502), both hardware or software (or a combination of hardware and software), may interface with each other or the interface (506) (or a combination of both) over the system bus (504) using an application programming interface (API) (512) or a service layer (514) (or a combination of the API (512) and service layer (514). The API (512) may include specifications for routines, data structures, and object classes. The API (512) may be either computer-language independent or dependent and refer to a complete interface, a single function, or even a set of APIs. The service layer (514) provides software services to the computer (502) or other components (whether or not illustrated) that are communicably coupled to the computer (502).

The functionality of the computer (502) may be accessible for all service consumers using this service layer. Software services, such as those provided by the service layer (514), provide reusable, defined business functionalities through a defined interface. For example, the interface may be software written in JAVA, C++, or other suitable language providing data in extensible markup language (XML) format or another suitable format. While illustrated as an integrated component of the computer (502), alternative implementations may illustrate the API (512) or the service layer (514) as stand-alone components in relation to other components of the computer (502) or other components (whether or not illustrated) that are communicably coupled to the computer (502). Moreover, any or all parts of the API (512) or the service layer (514) may be implemented as child or sub-modules of another software module, enterprise application, or hardware module without departing from the scope of this disclosure.

The computer (502) includes an interface (506). Although illustrated as a single interface (506) in FIG. 5, two or more interfaces (506) may be used according to particular desires or implementations of the computer (502). The interface (506) is used by the computer (502) for communicating with other systems in a distributed environment that are connected to the network (516). Generally, the interface (506) includes logic encoded in software or hardware (or a combination of software and hardware) and operable to communicate with the network (516). More specifically, the interface (506) may include software supporting one or more communication protocols associated with communications such that the network (516) or interface's hardware is operable to communicate physical signals within and outside of the computer (502).

The computer (502) includes at least one computer processor (162). Although illustrated as a single computer processor (162) in FIG. 5, two or more processors may be used according to particular desires or particular implementations of the computer (502). Generally, the computer processor (162) executes instructions and manipulates data to perform the operations of the computer (502) and any algorithms, methods, functions, processes, flows, and procedures as described in the instant disclosure.

The computer (502) also includes a memory (508) that holds data for the computer (502) or other components (or a combination of both) that can be connected to the network (516). For example, memory (508) may include a database storing data and/or processing instructions consistent with this disclosure. According to further embodiments, memory may correspond, for example, to memory (508) where the computer (502) has been implemented as a digital controller for the detection system (200). Although illustrated as a single memory (508) in FIG. 5, two or more memories may be used according to particular desires and/or implementations of the computer (502) and the described functionality. While memory (508) is illustrated as an integral component of the computer (502), in alternative implementations, memory (508) can be external to the computer (502).

An application (510) is an algorithmic software engine providing functionality according to particular desires and/or particular implementations of the computer (502), particularly with respect to functionality described in this disclosure. For example, the application (510) can serve as one or more components, modules, applications, etc. Further, although illustrated as a single application (510), the application (510) may be implemented as multiple applications (510) on the computer (502). In addition, although illustrated as integral to the computer (502), in alternative implementations, the application (510) can be external to the computer (502).

There may be any number of computers (502) associated with, or external to, the computer system (199) containing computer (502), each computer (502) communicating over network (516). Further, the term "client," "user," and other appropriate terminology may be used interchangeably as appropriate without departing from the scope of this disclosure. Moreover, this disclosure contemplates that many users may use one computer (502), or that one user may use multiple computers (502).

What is claimed is:

1. A method for hydraulic leak detection in unmanned locations, the method comprises:

obtaining a first pressure reading of a closed hydraulic system, wherein the closed hydraulic system comprises a header pressure pump operatively connected to the closed hydraulic system and configured to maintain a header pressure within the closed hydraulic system;

comparing, by a computer system, the first pressure reading is to a low level threshold;

responsive to the first pressure reading being less than the low-level threshold, starting the header pressure pump;
detecting, by the computer system, an opening of one or more production valves;
obtaining a second pressure reading;
comparing, by the computer system, the second pressure reading to a high-level threshold;
responsive to the second pressure reading being greater than the high-level threshold, terminating operation of the header pressure pump;
incrementing a pump counter of a monitoring system by one after terminating operation of the header pressure pump,
wherein the monitoring system is operably connected to the header pressure pump;
comparing, by the computer system, the pump counter of the monitoring system is to a pump cycle threshold;
responsive to the pump counter of the monitoring system being greater than the pump cycle threshold,
storing a first snapshot of a fluid level
starting a predetermined time interval following storing the first snapshot;
storing a second snapshot of the fluid level following expiration of the predetermined time interval;
calculating, by the computer system, a difference between the first snapshot and the second snapshot;
comparing, by the computer system, the difference to an allowable leak threshold;
responsive to the difference being greater than the allowable leak threshold, initiating an alarm; and
resetting the pump counter of the monitoring system at a specific time of day.

2. The method as claimed in claim 1, wherein the low-level threshold is 4000 pounds per square inch (PSI).

3. The method as claimed in claim 2, wherein the high-level threshold is 7000 PSI.

4. The method as claimed in claim 1 wherein the predetermined time interval is one hour.

5. The method as claimed in claim 1 wherein the specific time of day is set at midnight.

6. The method as claimed in claim 1 wherein the allowable leak threshold is one quart of a hydraulic fluid.

7. The method as claimed in claim 1 further comprising:
tallying a pump cycle count;
determining a hydraulic leak has occurred where one or more connectors are operatively connected within a closed hydraulic system; and
initiating the alarm.

8. A hydraulic leak detection system in unmanned locations, the system comprises:
a closed hydraulic system comprising:
a hydraulic fluid;
a fluid reservoir configured to hold the hydraulic fluid;
a header pressure pump;
one or more connectors;
one or more production valves;
a monitoring system operatively connected to the header pressure pump and comprising:
a pump counter, operatively connected to a programmable pressure controller;
a fluid sensor operatively disposed on the fluid reservoir, wherein the fluid sensor is configured to monitor a fluid level within the fluid reservoir;
an alarm;
a detection control subsystem comprising the programmable pressure controller operatively connected to the header pressure pump;
wherein one or more connectors are operatively connected within the closed hydraulic system and configured to transfer the hydraulic fluid;
wherein the one or more production valves are operably connected to the hydraulic system;
wherein the header pressure pump is operatively connected to the closed hydraulic system and is configured to maintain a header pressure within the closed hydraulic system;
wherein the programmable pressure controller is configured to control operation of the header pressure pump;
wherein the pump counter is configured to increase by one when the header pressure pump stops operation;
wherein the fluid reservoir is operatively connected to the header pressure pump;
wherein the detection control subsystem is configured to send control commands to components of the hydraulic leak detection system; and
wherein the header pressure pump, the programmable pressure controller, the pump counter, and the alarm are configured to receive commands from the detection control subsystem.

9. The system as claimed in claim 8 wherein the closed hydraulic system includes one or more hydraulic leaks where one or more connectors are operatively connected within the closed hydraulic system.

10. The system as claimed in claim 8 wherein the detection control subsystem further comprises:
a computer system;
the computer system is configured to monitor the fluid sensor and the pump counter;
the computer system is also configured to initiate the alarm;
the pump counter is a digital counter on the computer system; and
the computer system is operatively connected to the programmable pressure controller.

11. The system as claimed in claim 8 wherein the detection control subsystem further comprises:
a control panel operatively connected to the programmable pressure controller and configured to monitor the fluid sensor and the pump counter;
wherein the control panel is further configured to initiate the alarm; and
wherein the pump counter is a mechanical counter.

12. The system as claimed in claim 8 wherein the header pressure is maintained above 4000 pounds per square inch (PSI).

13. The system as claimed in claim 12 wherein the header pressure is maintained below 7000 PSI.

14. The system as claimed in claim 8 wherein the pump counter is reset at midnight.

* * * * *